US006990518B1

(12) United States Patent
Secer

(10) Patent No.: US 6,990,518 B1
(45) Date of Patent: Jan. 24, 2006

(54) OBJECT-DRIVEN NETWORK MANAGEMENT SYSTEM ENABLING DYNAMICALLY DEFINABLE MANAGEMENT BEHAVIOR

(75) Inventor: Semih Secer, Fair Oaks, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 652 days.

(21) Appl. No.: 09/816,693

(22) Filed: Mar. 22, 2001

(51) Int. Cl.
*G06F 15/173* (2006.01)

(52) U.S. Cl. .................. 709/223; 709/203; 709/220; 709/224

(58) Field of Classification Search ............. 709/203, 709/213, 218, 220–229, 230; 370/346, 450; 706/60–63; 714/25, 26, 48
See application file for complete search history.

(56) References Cited

U.S. PATENT DOCUMENTS

| 5,615,323 | A | | 3/1997 | Engel et al. | |
|---|---|---|---|---|---|
| 5,696,486 | A | * | 12/1997 | Poliquin et al. | 709/224 |
| 5,742,762 | A | * | 4/1998 | Scholl et al. | 709/223 |
| 5,889,470 | A | * | 3/1999 | Kaycee et al. | 370/465 |
| 6,047,279 | A | * | 4/2000 | Barrack et al. | 706/60 |
| 6,052,724 | A | * | 4/2000 | Willie et al. | 709/223 |
| 6,167,403 | A | * | 12/2000 | Whitmire et al. | 709/223 |
| 6,275,853 | B1 | * | 8/2001 | Beser et al. | 709/223 |
| 6,360,258 | B1 | * | 3/2002 | LeBlanc | 709/223 |
| 6,405,250 | B1 | * | 6/2002 | Lin et al. | 709/224 |
| 6,477,572 | B1 | | 11/2002 | Elderton et al. | |
| 6,513,129 | B1 | * | 1/2003 | Tentij et al. | 714/26 |
| 6,539,427 | B1 | * | 3/2003 | Natarajan et al. | 709/224 |
| 6,578,076 | B1 | | 6/2003 | Putzolu | |
| 6,611,866 | B1 | * | 8/2003 | Goldman | 709/224 |
| 6,664,978 | B1 | * | 12/2003 | Kekic et al. | 709/223 |
| 6,671,724 | B1 | | 12/2003 | Pandya et al. | |
| 6,678,835 | B1 | | 1/2004 | Shah et al. | |
| 6,687,748 | B1 | * | 2/2004 | Zhang et al. | 709/223 |
| 6,744,780 | B1 | * | 6/2004 | Gu et al. | 370/450 |
| 6,751,659 | B1 | | 6/2004 | Fenger et al. | |
| 6,782,420 | B1 | | 8/2004 | Barrett et al. | |
| 2003/0195957 | A1 | | 10/2003 | Banginwar | |
| 2004/0064541 | A1 | | 4/2004 | Ebata et al. | |

OTHER PUBLICATIONS

U.S. Appl. No. 09/345,634, Tentij et al.
U.S. Appl. No. 09/770,427, Secer.
U.S. Appl. No. 09/702,160, Harrop.
U.S. Appl. No. 09/469,026, Izzo et al.

(Continued)

*Primary Examiner*—Arid Etienne
*Assistant Examiner*—Ramy Osman

(57) ABSTRACT

The present invention is directed to a system and method in which management behavior within a network management system is represented as objects to allow for such management behavior to be dynamically defined. Management behavior may be dynamically created and/or modified by a user in various embodiments. Objects are used to represent management behavior, such as behavior associated with trap management and/or polling management. Such objects may be dynamically defined by a user and activated with the management system during system run-time, without requiring that the system be shut down to implement behavioral changes. The management system may be implemented with gateways distributed from a central management processor. Upon behavior objects being defined by a user, the system may determine appropriate gateways to receive the objects and autonomously communicate the objects thereto. Gateways may execute software that operates in accordance with behavior objects stored local thereto to manage network elements.

28 Claims, 7 Drawing Sheets

OTHER PUBLICATIONS

U.S. Appl. No. 09/469,025 filed Dec. 21, 1999, System and Method for Policy-Based Network Management. Inventor: Tentij.

U.S. Appl. No. 09/945,111 filed Aug. 31, 2001, System and Method for Flexible Processing of Management Policies for Managing Network Elements. Inventor: Klein et al.

U.S. Appl. No. 09/945,112 filed Aug. 31, 2001, User-Friendly System and Method for Defining Policies for Managing Network Elements. Inventor: Klein et al.

U.S. Appl. No. 09/945,372, filed Aug. 31, 2001, System and Method for Defining Management Policies for Managing Network Elements. Inventor: Klein et al.

* cited by examiner

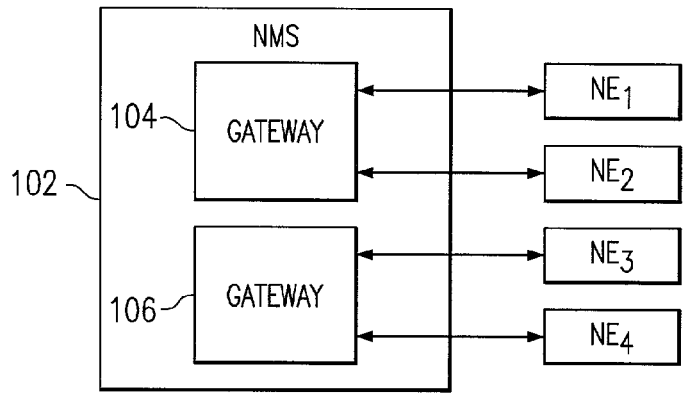
FIG. 1
(PRIOR ART)
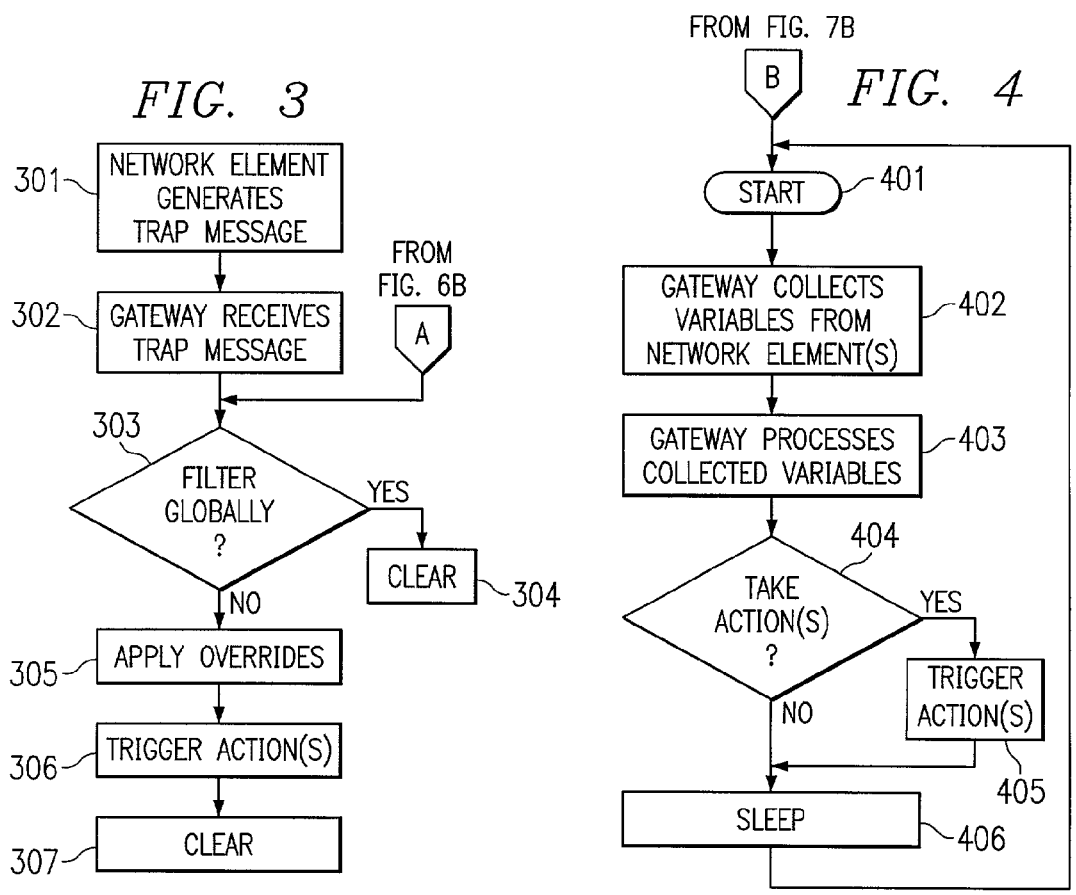

FIG. 7A
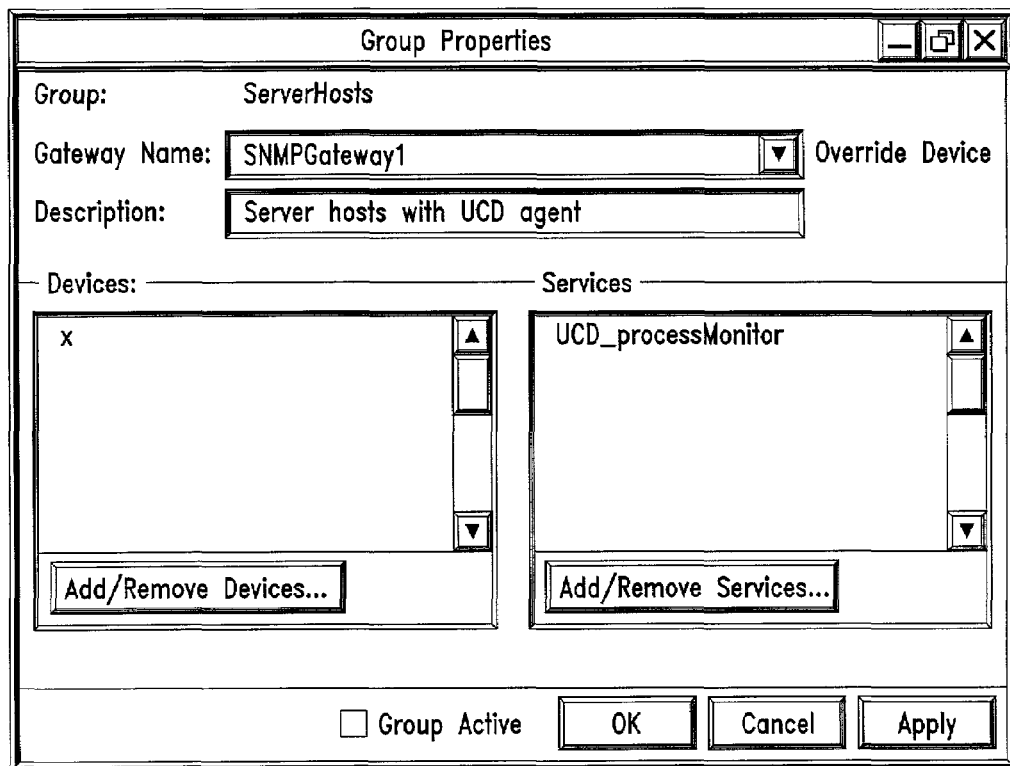
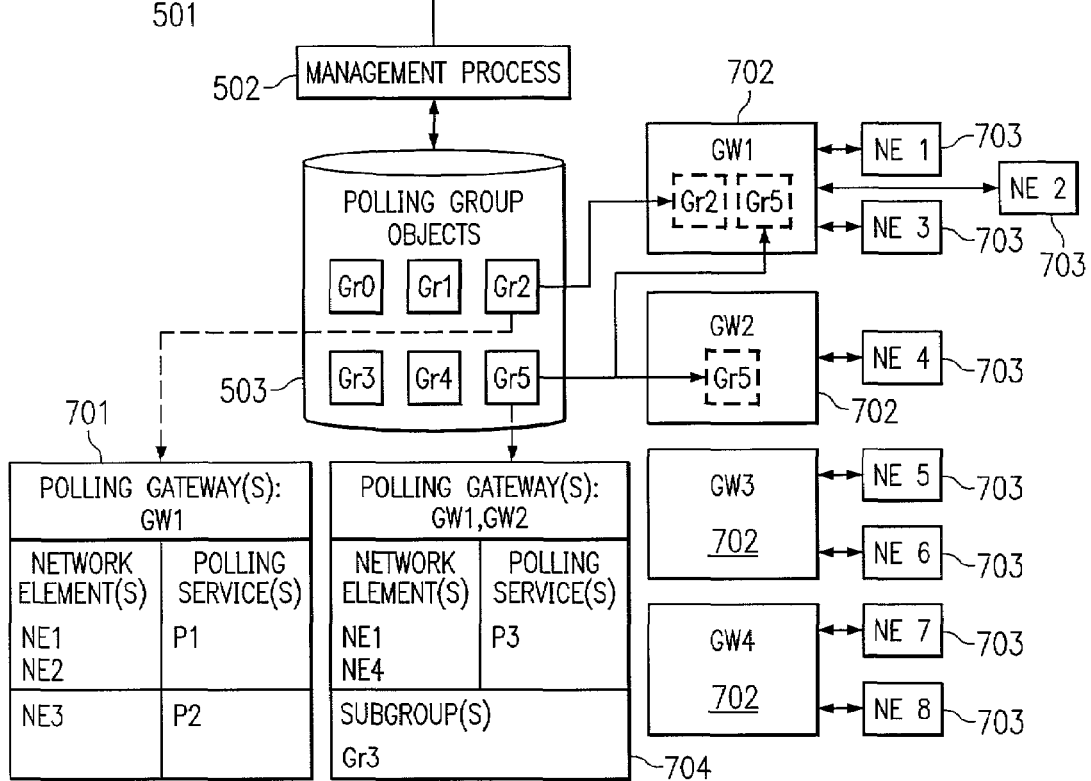

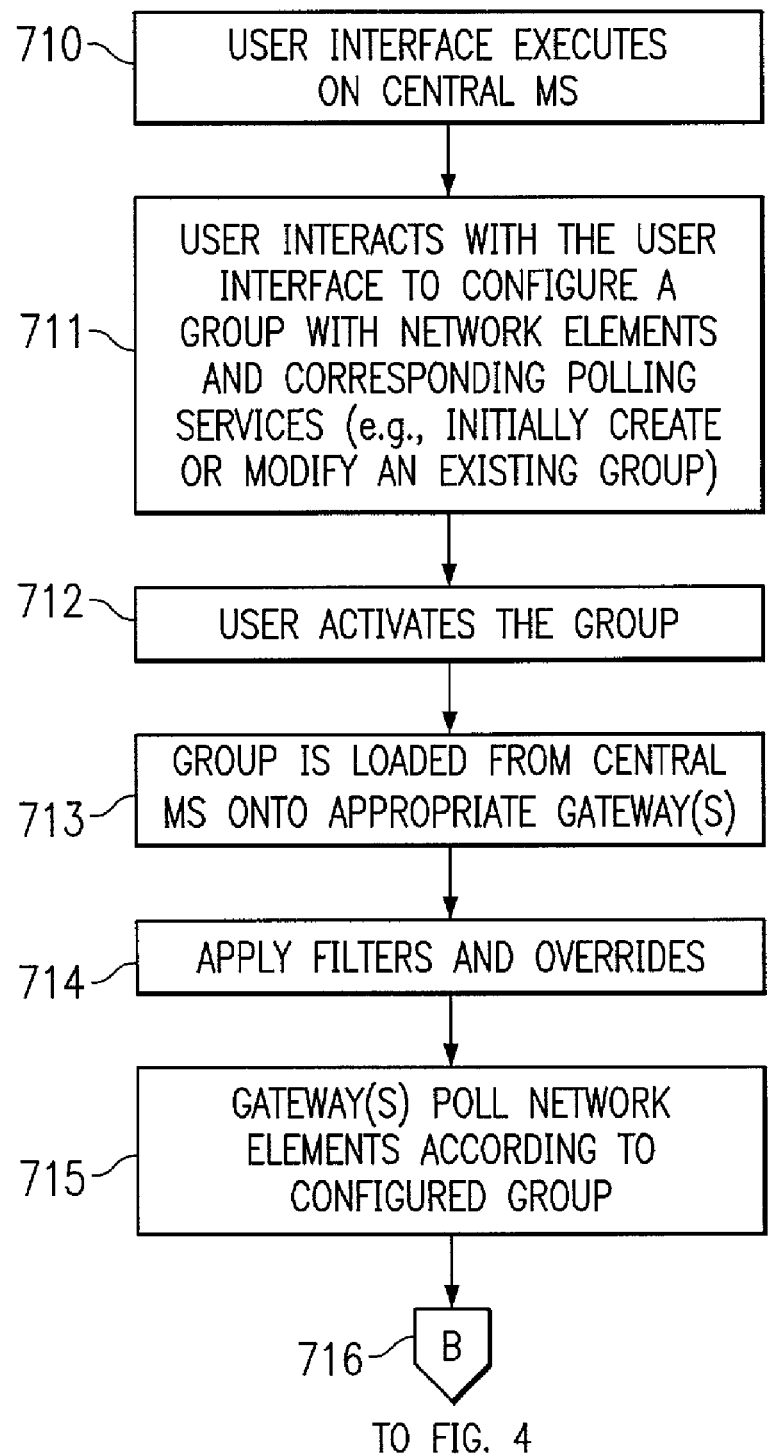

OBJECT-DRIVEN NETWORK MANAGEMENT SYSTEM ENABLING DYNAMICALLY DEFINABLE MANAGEMENT BEHAVIOR

RELATED APPLICATIONS

This application is related to co-pending application entitled "SYSTEM AND METHOD FOR POLICY-BASED NETWORK MANAGEMENT," assigned Ser. No. 09/469,025, filed Dec. 21, 1999; co-pending application entitled "SYSTEM AND METHOD FOR A COMMON OBJECT CLASS LIBRARY," assigned Ser. No. 09/469,026, filed Dec. 21, 1999; co-pending application entitled "FAULT MANAGEMENT SYSTEM AND METHOD," assigned Ser. No. 09/345,634, filed Jun. 30, 1999; co-pending application entitled "METHOD AND SYSTEM FOR PREDICTIVE ENTERPRISE RESOURCE MANAGEMENT," assigned Ser. No. 09/702,160, filed Oct. 30, 2000; and co-pending application entitled "SYSTEM AND METHOD FOR MANAGING A COMMUNICATION NETWORK UTILIZING STATE-BASED POLLING," assigned Ser. No. 09/770,427, filed Jan. 26, 2001, all of which are assigned to a common assignee, the disclosures of which are hereby incorporated herein by reference.

TECHNICAL FIELD

This application relates in general to network management systems, and more specifically to a system and method in which a network management system enables dynamically definable management behavior, wherein management behavior is represented as objects that may be defined (e.g., created and/or modified) during run-time of the management system.

BACKGROUND

The information-communication industry is an essential element of today's society, which is relied upon heavily by most companies, businesses, agencies, educational institutions, and other entities, including individuals. As a result, information service providers such as telephone, cable, and wireless carriers, Internet Service Providers (ISPs) and utility companies all have the need to deploy effective systems suitable for servicing such a demand. The importance of such information service providers rapidly deploying new systems and system elements and altering their existing management systems to accommodate evolving business and network requirements as needed has been recognized in the prior art. For example, it has been recognized that information service providers desire the ability to integrate existing network equipment and systems with new elements and applications, customize existing systems and applications, and scale systems to accommodate growing networks and traffic volumes.

Network management and operations have become crucial to the competitiveness of communication companies, utilities, banks and other companies operating Wide Area Networks (WANs) of computer devices and/or other network types and devices, including SONET, Wireline, Mobile, etcetera. For instance, many companies currently use customized "legacy" network management systems (NMSs) and operations support systems (OSSs). Various implementations of NMSs/OSSs are available in the prior art for managing networks and network elements.

Thus, management systems have been implemented in the prior art for managing communication networks and network elements. Communication networks are not static, and therefore management behavior for managing communication networks does not remain static. For example, various types of equipment from different vendors are commonly being coupled to Internet Protocol (IP) networks (such as the Internet), which often results in different management solutions being implemented for equipment supplied by different vendors. For example, when a network provider introduces a new type of equipment (e.g., from a new vendor) into an IP network, the management solutions implemented for the IP network typically have to be modified. For instance, the network provider has to modify the software code for the network management program in order to support this new equipment type. To modify the software code, the network provider typically must either manually write the code modifications or purchase from the vendor suitable code for managing the new equipment. In either case, this prior art technique of modifying the management software for new device types added to a network is problematic because it delays the capability of managing an added device. Such a delay or an interruption in the management of the network elements (e.g., devices) is typically undesirable to a network provider because an event may occur that affects the network elements during the delay/interruption and the network provider would have no knowledge of such event.

Another limitation that exists in prior art network management solutions arises regarding modification of management behavior. For example, a network provider may, from time to time, want to change the behavior of a network management system. For instance, a network provider may want to change the actions that are triggered by the network management system in response to a device failing (e.g., change a user alert that is presented responsive to such a device failure, or change the polling interval for retrieving variable information, such as CPU usage, memory capacity, etc. for a device). Network management systems may provide tools, such as a user interface, that allow a network provider to make such behavioral changes (e.g., by coding new behavior into the system). However, such behavioral changes cannot be implemented during run-time of a management system. That is, when network providers want to make a behavioral change in prior art management systems, they have to freeze the system, make the changes, and then unfreeze the system to activate the new management behavior. In the meantime, minutes to hours may be lost for managing the network elements. Again, such lost management time is generally undesirable to network providers.

Another common limitation in prior art management solutions is the centralized (e.g., non-distributed) nature of most solutions. Centralized solutions have limited capabilities as they tend to have performance problems and generate too much traffic as well. Also, they cannot intrude through firewalls and manage devices behind firewalls. This also limits their ability to manage multiple customer networks and resolve other issues that may exist within a network.

Thus, with prior art network management systems, network providers must spend time rewriting the management software code or purchase custom management code from the vendor to manage a new device and/or to implement behavioral changes. In either case, the network provider must obtain the new code for managing devices the way they want them to be managed, and then the management system must be shut down to load the new management code on the system. Thus, there is down time in loading the new code during which the providers network is not managed. Accordingly, new management behavior cannot be implemented in prior art management systems without interrupting management of the network elements (e.g., because of shutting the management system down).

Prior art network management systems commonly recognize faults (or "traps") generated within the network and/or utilize polling of the network elements to provide management. For example, IP and Simple Network Management Protocol (SNMP) devices may generate fault messages (which may be referred to as traps), which are unsolicited messages that may be received by the management system. Examples of such trap messages include messages that indicate a network element's CPU utilization is too high, a network element just rebooted, available data storage capacity is low on a network element, an interface on a network element is down. Various other types of unsolicited trap messages may be generated by a network element and received by a network management system, as those of ordinary skill in the art will recognize. Such messages are generally generated in a defined protocol, such as SNMP, which the management system can recognize to process the received messages.

Various challenges may be encountered in utilizing such trap messages in a network management system. An example of one challenge is that a vendor may, from time to time, change or add trap messages that may be generated by a particular device. For instance, a management system may expect to receive any of fifteen different messages from a certain device. However, the vendor for such device may modify two existing messages that the device is capable of generating and add four new messages capable of being generated by the device to result in a total of nineteen different messages that may be generated by the device. In response to such a change by the vendor, a network provider typically is required to modify the management software code to account for such message changes/additions, which may be very time consuming.

As IP networks grow to include hundreds to thousands of devices, which may be provided by different vendors and be very distributed (e.g., provided in different locations), modifying management system behavior to account for such a continually changing network topology becomes very difficult.

SUMMARY OF THE INVENTION

The present invention is directed to a system and method in which management behavior within a network management system is represented as objects to allow for such management behavior to be dynamically defined. That is, management behavior may be dynamically created and/or modified by a user in various embodiments of the present invention.

As described above, prior art management solutions (such as SNMP management solutions of the prior art) typically require programmatic methods to define how a management application will behave in response to trap events received from a network, or to define polling functionality (including specifying which variables to retrieve from network elements, what metrics to derive, what threshold or test conditions to apply, etc.). Such defined behavior is typically not dynamically alterable at system run-time.

Various embodiments of the present invention provide a system and method for defining (e.g., configuring and/or altering) management application behavior. Further, in certain embodiments such management behavior may be defined and activated during run-time of the management system, without requiring that the system be shut down and restarted to implement behavioral changes. Further, various embodiments provide a management system operable to generate a graphical user interface (GUI) with which a user may interact to easily define/activate management behavior as desired. Thus, various embodiments of the present invention provide a flexible method for defining management behavior.

According to at least one embodiment, a system for managing network elements is disclosed, which comprises a management information base operable to store objects that represent user-defined management behavior. The system further comprises a management processor communicatively coupled to the management information base, and at least one gateway communicatively coupled to the management processor, wherein the such gateway is operable to manage one or more network elements. In certain embodiments, one or more behavior objects are stored in the management information base defining management behavior for managing the network elements. Such behavior objects may include a relationship attribute identifying its relationship within the managed network. For instance, the relationship attribute may specify one or more gateways which are to perform the management behavior defined by such behavior object.

Thus, various embodiments utilize objects to represent management behavior, such as behavior associated with trap management and/or polling management. Further, such objects may be dynamically defined by a user and activated with the management system during system run-time. Preferably, the management system is implemented in a distributed fashion with gateways distributed from a central MS. In such a distributed implementation, relationship attributes may be maintained for each behavior object to specify the appropriate one(s) of distributed gateways to which the behavior objects are to be communicated. Upon behavior objects being defined (e.g., created or modified), the system may utilize the relationship attributes associated with such behavior objects to autonomously communicate the behavior objects to the appropriate gateways. Gateways may execute management software which operates in accordance with (e.g., is controlled by) behavior objects stored local to such gateways. Therefore, by creating or modifying a behavior object, the management behavior of a gateway may be dynamically altered. Thus, such an object-driven implementation of management behavior allows for management behavior to be dynamically defined (e.g., created and/or modified) in a manner desired by a network administrator, and further enables such defined management behavior to be activated during system run-time. Accordingly, great flexibility and ease of use in maintaining proper management behavior within a management system may be achieved.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 1 shows an exemplary implementation of a prior art network management system;

FIG. 3 shows an exemplary operational flow diagram that may generally be implemented within a management system for utilizing trap messages;

FIG. 4 shows an exemplary operational flow diagram that may generally be implemented within a management system for polling network elements;

FIGS. 7A–7B show an exemplary system and operational flow diagram for dynamically defining management behavior for polling activities as may be implemented in various embodiments of the present invention.

DETAILED DESCRIPTION

Figure 2:
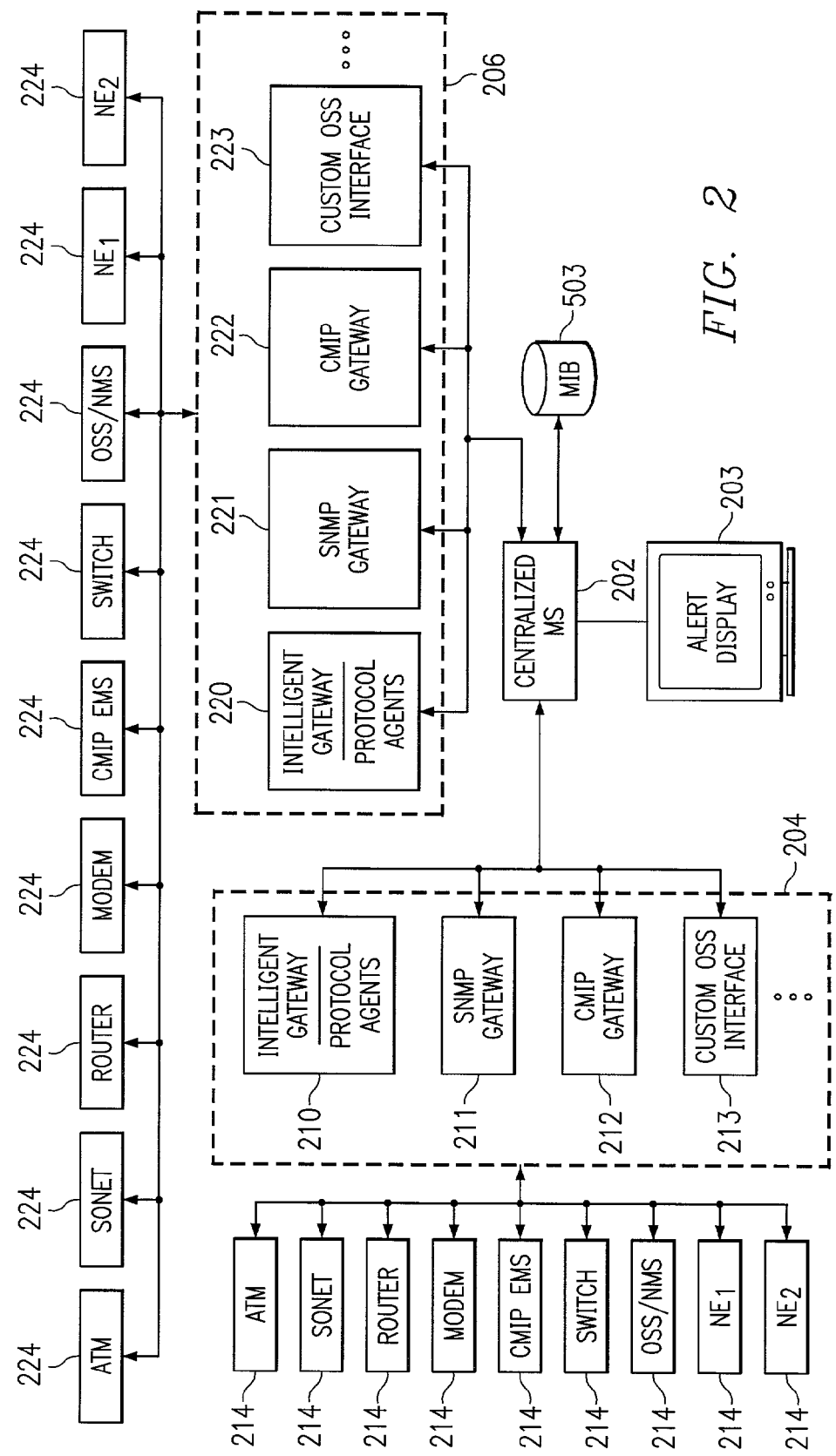
FIG. 2 shows an example of a distributed approach for a network management system.

Various embodiments of the present invention provide a system for managing network elements utilizing objects to represent such network elements and management behavior. Various situations may arise in which it is desirable to dynamically define management behavior. That is, various situations may arise in which it is desirable to specify a new management behavior and/or modify an existing management behavior. As examples, a new network element may be added to the managed network, a network element may be removed from the managed network, a network element may be implemented by a vendor to generate new trap messages (not previously encountered by the management system), existing trap messages capable of being generated by a network element may be modified by a vendor, and a network administrator may desire to modify polling activities, modify responsive actions for trap messages, or modify other management behavior, all of which may result in a network administrator desiring to dynamically define management behavior.

While network elements of a communication network may be very distributed, prior art management systems are typically not distributed. Gateways have been implemented in prior art network management systems for polling and monitoring the operations of various network elements. An exemplary implementation of a prior art network management system is shown in FIG. 1. As shown, network management system (NMS) 102 includes gateways 104 and 106, which receive unsolicited messages (traps) and/or poll network element(s) to gather information about various operational characteristics of such network element(s). For instance, in the example of FIG. 1, gateway 104 polls (or requests information from) network elements 1 and 2, and gateway 106 polls network elements 3 and 4. Gateways of prior art systems are typically implemented to poll their respective network elements according to pre-set time intervals. For instance, a gateway may be pre-set to poll its respective network element(s) once every five minutes or once every twenty minutes, as examples. Thus, gateways 104 and 106 are typically implemented having a pre-set polling interval. Such gateways may also receive unsolicited fault messages (or "traps") from their respective network elements.

Gateways of the prior art, such as gateways 104 and 106, are typically implemented to access (e.g., communicate with) network element(s), such as network elements 1–4, to request values for various variables detailing information about the operation/performance of the network element(s). For example, a gateway may periodically poll a network element to determine whether the network element is operational and responding to the poll. If a network element fails to respond to such a poll, such failure to respond may be indicative of a problem with the network element, such as the network element having a hardware or software failure. As other examples, a gateway may periodically poll a network element to determine the workload being placed on such network element, the network element's available memory capacity, etcetera. Once the gateways receive the variable values from the network elements in response to a poll, the gateways then process such variable values to monitor the operation of the network element(s). For instance, if a gateway polls a network element for a response and fails to receive such a response, the gateway may provide an alert to the network administrator (e.g., by presenting an alert message to a computer workstation coupled to NMS 102) notifying him/her of a problem with the network element. Similarly, if a gateway polls a network element for its available memory and determines that such network element has little or no memory available, the network administrator may be alerted as to such condition.

Furthermore, as shown in FIG. 1, the gateways are typically not distributed, but are instead included within the network management system (NMS 102). As a result, a great operational burden is placed on the NMS 102 because all of the poll responses and gateway processing is included within the NMS 102. Additionally, communication traffic to/from NMS 102 may become congested.

In some management systems, such as that disclosed in co-pending patent application Ser. No. 09/770,427 entitled "SYSTEM AND METHOD FOR MANAGING A COMMUNICATION NETWORK UTILIZING STATE-BASED POLLING," the gateways may be distributed to ease the operational burden on the NMS. However, in distributed systems the above-described problems of altering management behavior may be increased. For example, a network provider may be required to rewrite the management code and take the system down to implement the code at each location.

At least one embodiment of the present invention utilizes distributed gateways for managing network elements. An example of such a distributed approach for a network management system is further shown in FIG. 2. In certain embodiments, state models may be defined/altered by a user (e.g., a system administrator) at a central management system (MS) and then pushed out to the distributed gateways, an example of which is further described in co-pending patent application Ser. No. 09/770,427 entitled "SYSTEM AND METHOD FOR MANAGING A COMMUNICATION NETWORK UTILIZING STATE-BASED POLLING," the disclosure of which has been incorporated herein by reference. For instance, state models may be defined/altered by a user at a centralized MS and then pushed out to one or more distributed gateways via a suitable communication network that communicatively couples the centralized MS to such distributed gateways. Of course, in alternative embodiments state models may not be used for management within the gateways. Further, in alternative embodiments, gateways may not be implemented in a distributed fashion, but may instead be implemented within (or local to) a central management system.

As shown in FIG. 2, central MS 502 may be communicatively coupled to numerous gateways distributed about the network for managing various network elements. As shown, central MS 202 may be communicatively coupled to distributed gateways or groups of distributed gateways. For example, group 204 may be implemented at one geographic location of a network and group 206 may be implemented at another geographic location of such network. Group 204 may include various gateways for monitoring (e.g., polling) particular types of network elements. For instance, each gateway may monitor network elements having particular communication protocols, including as examples intelligent gateway 210, SNMP gateway 211, CMIP gateway 212, and custom OSS interface gateway 213, which may monitor various network elements 214, such as ATMs, Sonets, routers, modems, CMIP EMSs, switches, OSSs/NMSs, as well as various other network elements local to group 204. Likewise, group 206 may include various gateways for monitoring (e.g., polling) particular types of network elements. Each gateway may monitor network elements having particular communication protocols, including as examples intelligent gateway 220, SNMP gateway 221, CMIP gateway 222, and custom OSS interface gateway 223, which may monitor various network elements 224, such as ATMs, Sonets, routers, modems, CMIP EMSs, switches, OSSs/NMSs, as well as various other network elements local to group 206.

In a preferred embodiment, data collected by the distributed gateways may be communicated to the centralized MS. For example, polling services (which may include state models) may be loaded onto the distributed gateways, and such gateways may execute the polling services to monitor their respective network elements. In this manner, the gateways can act as filters by only communicating necessary data about the network elements back to the central MS, thereby alleviating much of the processing and communication traffic burden from the central MS.

The management system of various embodiments of the present invention is preferably object-driven. For instance, network elements and management behavior are preferably represented by objects within the management system. Such objects may be stored in management information base (MIB) 503, which may, for instance, be a database or other suitable data storage management. MIB 503 is communicatively coupled to central MS 202. More specifically, MIB 503 may be integrated within or external to central MS 202, and a management process executing on central MS 202 is capable of accessing MIB 503 to store/retrieve objects. Also, as shown in FIG. 2, one or more alert displays 203 (e.g., work stations equipped with input and output devices) may be communicatively coupled to central MS 202 for enabling interaction with a user (e.g., a network administrator).

Because various embodiments utilize objects to define management behavior, the management system of such embodiments provides great flexibility in allowing objects to be created/modified in order to dynamically define management behavior. Additionally, objects may have an attribute specifying the relationship of such objects to the network elements and/or gateways. That is, a behavior object preferably includes a relationship attribute defining the relationship of the behavior within the managed network. Accordingly, upon an object being created/modified, the central MS may determine to which gateways and/or network elements the object relates and implement the management behavior defined by such object for the related network elements and/or gateways. For instance, as described in greater detail hereafter, a user (e.g., network administrator) may define a management behavior, such as management behavior responsive to particular trap messages or management behavior for polling network elements. The user may specify one or more distributed gateways which need to execute the defined management behavior (e.g., need to respond to particular trap messages or perform defined polling activities), and such gateways may be identified in a relationship attribute of the object defining the management behavior. As a result, the central MS may communicate (e.g., "push") the created management behavior (e.g., the object defining such management behavior) to the appropriate gateways to which the management behavior relates. Thereafter, a user may modify the management behavior at the central MS, and such modification is then automatically communicated to the appropriate gateways.

As also described in greater detail below, in certain embodiments, rather than or in addition to a user specifying the gateways to which a behavior object relates, the management system may effectively "learn" the appropriate gateways for the behavior object. For instance, a user may define a management behavior for a particular trap message. Upon a distributed gateway first receiving the particular trap message from a network element, the gateway checks its memory and determines that it does not have a defined behavior for the particular trap message. Therefore, the gateway notifies the central MS of the received trap message, and the central MS determines that the user has defined a behavior object for the particular trap message. Therefore, the central MS updates the relationship attribute of the behavior object to indicate that this gateway needs such behavior object, and the central MS communicates the behavior object to the gateway so that the gateway can respond to the particular trap message appropriately. The next time that the gateway receives the particular trap message, it will determine that the behavior object for such trap message is stored in its memory and may therefore execute the behavior object without being required to first access the central MS. Furthermore, if a user later modifies the behavior object, such modification will be automatically communicated from the central MS to all gateways that need such behavior object (as specified in the behavior object's relationship attribute).

The management system of various embodiments of the present invention may utilize various techniques for gathering information for managing network elements. For example, the management system may receive trap messages from the network elements and use information associated with the trap messages to manage the network elements. As another example, the management system may poll network elements for information useful in managing the network elements. Management behavior(s) may be defined for trap messages and/or polling activities. For example, behaviors such as generating an alert, logging information to a database, logging to other systems, initiating polling, filtering, performing suppression, performing correlation, performing thresholding, and/or triggering an e-mail, page, or other communication may be defined as behaviors desired by a user for different trap messages and/or polling activities. Generating an alert includes generating information to be presented to a user (e.g., via an alert display) to notify the user of some event within the managed network. Such information may be similarly logged to a database for storage or to another system for processing therein. A particular polling service may be initiated to poll network elements for information. Information received from network elements may be filtered. Similarly, information received from network elements may be suppressed. For instance, failure of a first network element may cause performance problems with a second network element, and therefore messages received from the second network element that indicate such performance problems may be suppressed (e.g., ignored) since it is known that the failure of the first network element is the root cause. Information received for one or more network elements may be correlated, which may, for example, aid in the management system determining a root cause of a problem within the network. As an example of thresholding, a network element may be unable to respond immediately to a poll (because the network element may be busy performing some other task). Thus, the failure to respond is not actually indicative of a problem. However, if the network element fails to respond to five consecutive polls, then it may be indicative of a problem. Thus, for instance, thresholding may specify the number of consecutive times a network element must fail to respond to a poll before it is determined that a problem exists. An e-mail, page, or other form of communication may be triggered to notify a network administrator of a particular problem and/or to notify appropriate technicians responsible for servicing faulty network elements of a problem, as examples. Various embodiments of the present invention enable such management behaviors to be dynamically defined (e.g., created and/or modified).

An example of a general operation for utilizing trap messages for managing network elements is described in conjunction with FIG. 3. That is, FIG. 3 shows an exemplary operational flow that may generally be implemented within a management system for utilizing trap messages. In operational block 301, a network element may generate a particular trap message. For instance, such trap message may indicate information about the operational performance of the network element, such as the network element has recently re-booted, the network element's CPU utilization is too high, the network element's storage capacity is diminished, an interface of the network element is down, etc. A gateway responsible for such network element receives the trap message in operational block 302. For instance, in the above-described distributed environment, one of the distributed gateways responsible for monitoring the network element receives the trap message. At block 303, the gateway determines whether to filter "globally." That is, the gateway may determine to filter the fault (trap) message as the fault message may not be a very useful message to the user. Therefore, the gateway does not execute any management activity (which is stored in objects) and ignores the message. This may be a "global" filter, meaning the message will be ignored no matter where it comes from. That is, the fault message (trap) is cleared from the distributed gateway's memory before it is processed further as it is to be ignored. If determined that the trap message is filtered, then execution advances to block 304 at which the trap message is cleared.

If determined in block 303 that the trap message is not filtered globally, execution advances to block 305 where overrides are applied by the gateway. As an example of an override, certain network elements may be defined by a network administrator to use a different trap object than the one typically triggered for a particular trap message. For instance, a first management behavior object may be defined for a "Trap-5" message. However, a network provider may desire for a different behavior object to be utilized if the Trap-5 message is received for a particular network element, and may therefore specify an override for the Trap-5 message for the particular network element, which causes a different behavior object to be executed. At block 306, the gateway triggers the appropriate actions for the trap message, such as those actions described above. Thereafter, at block 307, the trap message may be cleared.

In some instances trap messages may be insufficient for managing a network. For instance, a network provider may want to know information about network elements which is not provided in trap messages. Also, the communication protocol utilized for trap messages may be relatively unreliable. For example, UDPIP may be utilized for communicating trap messages, which is not very reliable. Accordingly, network management systems often implement polling of network elements to request desired information from such network elements.

Turning now to FIG. 4, an example of a general operation for polling network elements is described in conjunction therewith. That is, FIG. 4 shows an exemplary operational flow that may generally be implemented within a management system for polling network elements. As shown, polling execution starts in operational block 401, and the gateway responsible for particular network elements collects variables therefrom at block 402. For example, a gateway may poll a network element for information about the operational performance of such network element. For instance, the gateway may request a variable (e.g., data) indicating the network element's CPU utilization percentage and/or a variable indicating the network element's available storage capacity. As a further example, a gateway may poll a network element to ensure that the network element is responding (e.g., is operational and capable of communicating with the gateway). At block 403, the gateway processes the collected variables. As an example, the variables may be processed based on a state-model behavior object that is defined by the user. An example of such state-based modeling is further described in co-pending patent application Ser. No. 09/770,427 entitled "SYSTEM AND METHOD FOR MANAGING A COMMUNICATION NETWORK UTILIZING STATE-BASED POLLING." Processing these variables could trigger user-defined actions such as alarm-generation, e-mail, forwarding the message to other systems, reporting data, and configuring an element. Such processing may be formed in the distributed gateway based on user-defined management objects.

At block 404, the gateway determines, based on the processing of block 403, whether to trigger any actions. For example, if the collected variable is indicative of a performance problem, management behavior may be defined specifying that the gateway is to trigger particular actions, such as alerting a user, logging the problem to a database, and/or initiate further polling, as examples. If determined in block 404 that actions are to be taken, then the gateway triggers such actions in block 405. If, on the other hand, it is determined in block 404 that actions are not to be taken, then the polling process sleeps at block 406. That is, the polling process pauses at block 406 until such polling is later triggered. The polling process may be triggered periodically (e.g., after a defined time delay) or may be triggered in response to the occurrence of some event, as examples. Once the polling process is triggered, execution returns from block 406 to block 401 to restart the polling process.

Figure 5A:
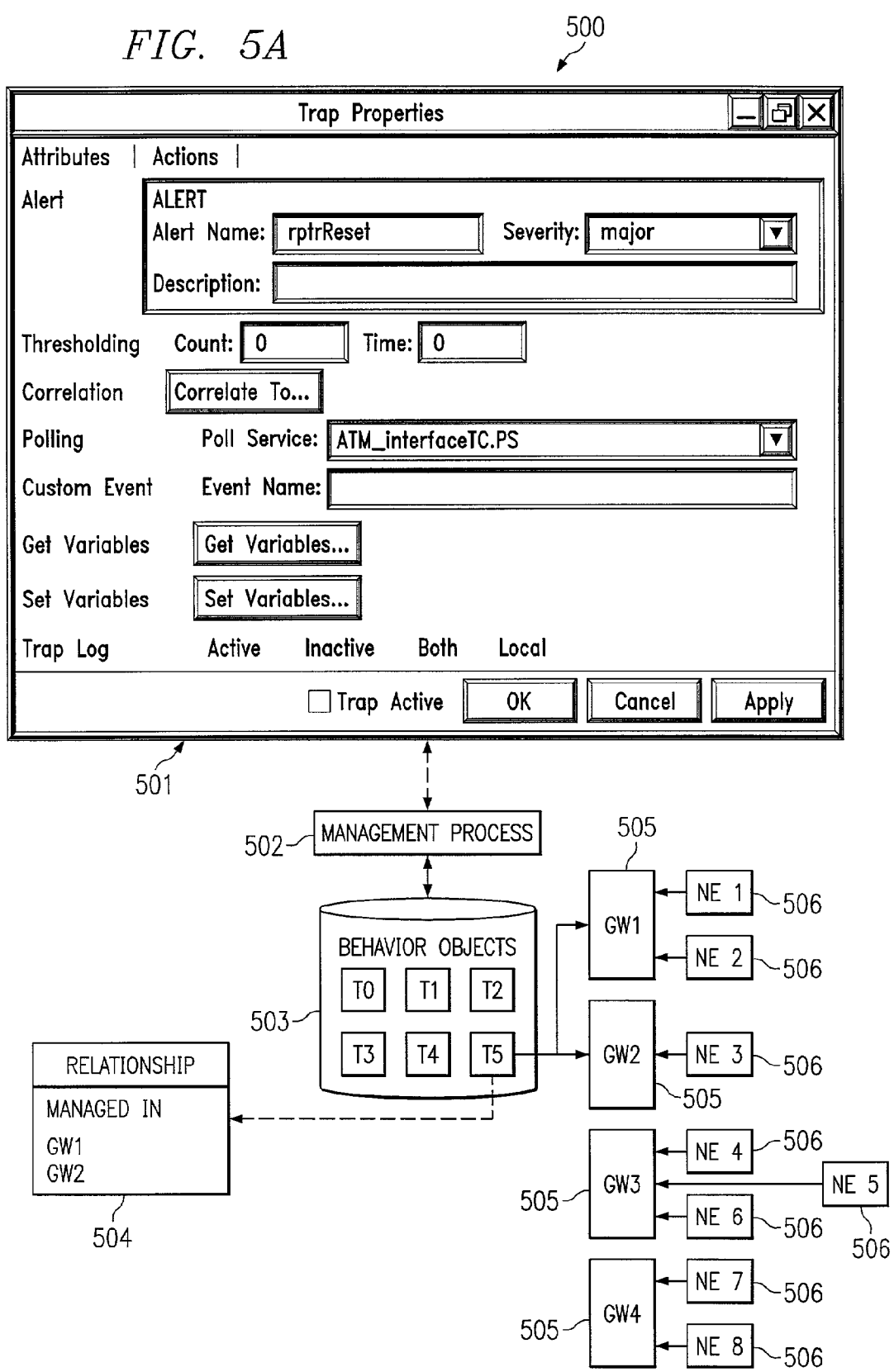
FIG. 5A shows an exemplary implementation of one embodiment of the present invention, which illustrates use of objects in managing trap messages.

Turning to FIG. 5A, an exemplary implementation of one embodiment of the present invention is shown in which use of objects in managing trap messages is further described. As shown, system 500 includes management process 502 that may be executing on a central MS, which is capable of accessing MIB 503. MIB 503 has stored therein various behavior objects, which may define the management behavior for different tap messages that may be generated by network elements 506. For instance, exemplary objects T0–T5 are shown, which may define management behavior for messages "Trap-0"–"Trap-5," respectively, that may be generated by network elements 506. Distributed gateways 505 are implemented to manage network elements 506. More specifically, in the example of FIG. 5A, gateway GW1 manages network elements (NEs) 1–2, GW2 manages NE 3, GW3 manages NEs 4–6, and GW4 manages NEs 7–8. Distributed gateways 505 are communicatively coupled to the central MS and therefore are capable of receiving information from MIB 503.

A user (e.g., system administrator) may interact with exemplary user interface 501 to define a management behavior for a certain trap message. For instance, a user may interact with user interface 501 to specify that upon a certain trap message (e.g., "Trap-5") being encountered, certain actions are to be initiated, such as generating an alert to a display, thresholding (e.g., determining whether the message is received X times within Y time period), correlation (e.g., correlating the trap message with other messages), initiating a polling service (which is described in greater detail below), triggering a custom event, getting particular variables, setting particular variables, and/or logging the message to a trap log database, as examples. Various screens may be presented to a user via interface 501 to allow a user to define the desired management behavior to execute in response to receipt of a certain trap message. The management behavior defined by a user via interface 501 is maintained as a behavior object (in MIB 503) for the particular trap message for which such behavior was defined, and the behavior may be triggered upon such trap message being encountered. From time to time, a user may dynamically create new behavior objects corresponding to trap messages (e.g., corresponding to trap messages newly added to a device by a vendor) and/or modify existing behavior objects. It should be appreciated that such an implementation allows for management behavior to be defined (e.g., created or modified) and activated within the management system of certain embodiments during run-time of the management system. Thus, a user is not required to freeze or shutdown the management system to activate newly defined management behavior. Accordingly, management of the network elements is not required to be interrupted in order to modify the management behavior of the system.

Each behavior object stored in MIB 503 may have a relationship attribute that specifies the gateways and/or network elements to which that behavior object relates. For instance, in the example of FIG. 5A, object T5 includes a relationship attribute 504, which specifies that object T5 is "managed in" gateways GW1 and GW2. Therefore, because the behavior object "knows" the relationship of other elements (e.g., gateways and/or network elements) thereto, the behavior object can automatically know which elements it needs to inform when it is defined (e.g., when the object is initially created or later modified). A user (e.g., system administrator) may specify the relationship(s) for the behavior object by, for instance, interacting with user interface 501 generated by management process 502. Additionally or alternatively, the management system of certain embodiments may autonomously "learn" the related elements for a behavior object in the manner described more fully below in conjunction with FIGS. 6A and 6B.

Thus, in the example of FIG. 5A, because behavior object T5 has a relationship attribute specifying that it is managed in gateways GW1 and GW2, the behavior object T5 is communicated from the central MS to such gateways GW1 and GW2. Accordingly, behavior object T5, which defines the management behavior for a "Trap-5" message, may be stored in the memory of gateways GW1 and GW2. Thereafter, if gateways GW1 and GW2 receive a "Trap-5" message from their respective network elements, the gateways manage such network elements according to the management behavior defined by object T5 (unless an override is defined for the network element from which the Trap-5 message is received). As a result, the software code implemented on the gateways may remain the same, and such code may alter its execution based on the contents of the behavior object(s) to perform the desired management behavior.

Figure 5B:
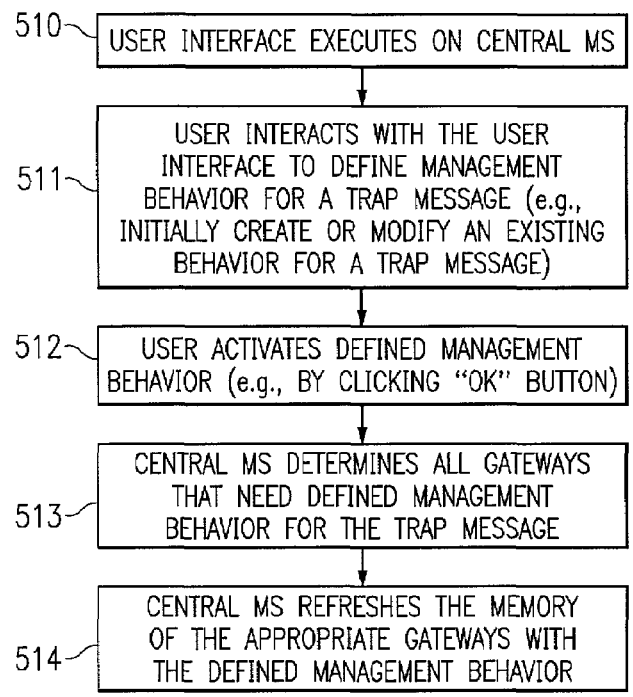
FIG. 5B shows an exemplary operational flow diagram for a user defining management behavior according to at least one embodiment of the present invention.

Turning now to FIG. 5B, an exemplary operational flow diagram is shown for a user defining management behavior according to at least one embodiment of the present invention. First, at operational block 510, a user interface (e.g., user interface 501 of FIG. 5A) executes on the central MS. Such a user interface may be generated by management process 502 (e.g., software code) executing on the central MS, and such user interface may be presented to a user on a display terminal communicatively coupled to the central MS. At block 511, the user interacts with the user interface to define the desired management behavior (e.g., generating alerts, performing correlation, initiating a polling service, etc.), for a trap message. For example, the user may interact with the user interface to define a management behavior for trap message "Trap-5," and such behavior may be maintained as an object in MIB 503. It should be understood that as used herein "defining" management behavior is intended to encompass creating a management behavior, as well as modifying an existing management behavior. Thus, in block 511, the user may initially create a management behavior for a particular trap message, or the user may modify an existing management behavior for a particular trap message. Once the management behavior is defined, the user activates the behavior in block 512. For instance, the user may click an "Apply" or an "OK" button on the user interface to activate the defined management behavior.

In operational block 513, the central MS determines which of the distributed gateways need the defined management behavior for the particular trap message. For instance, some gateways may manage network elements that generate the particular trap message, and therefore need the defined management behavior for such trap message, while other gateways may manage network elements that do not generate the particular trap message, and therefore do not need the defined management behavior for such trap message. In certain embodiments, the central MS may determine the distributed gateways that need the defined management behavior from the relationship attribute of the object representing such management behavior. The relationship attribute may specify the appropriate gateways from user input (e.g., a user may input an indication of the appropriate gateways to which the behavior relates via user interface 501). Additionally or alternatively, in some embodiments the management system may autonomously "learn" the appropriate gateways to which the behavior relates, and may autonomously update the behavior object's relationship attribute to include the "learned" gateways, which is described more fully below. At operational block 514, the central MS refreshes the memory of the appropriate gateways with the defined management behavior. For instance, in certain embodiments, the central MS communicates the behavior object defining the management behavior for a particular trap message to the appropriate gateways, which store the behavior object in their memory for later use. By communicating only the appropriate objects to the appropriate gateways, communication traffic resulting from a modification in management behavior may be reduced and the amount of gateway memory required for storing behavior may be minimized, according to certain embodiments.

Figure 6A:
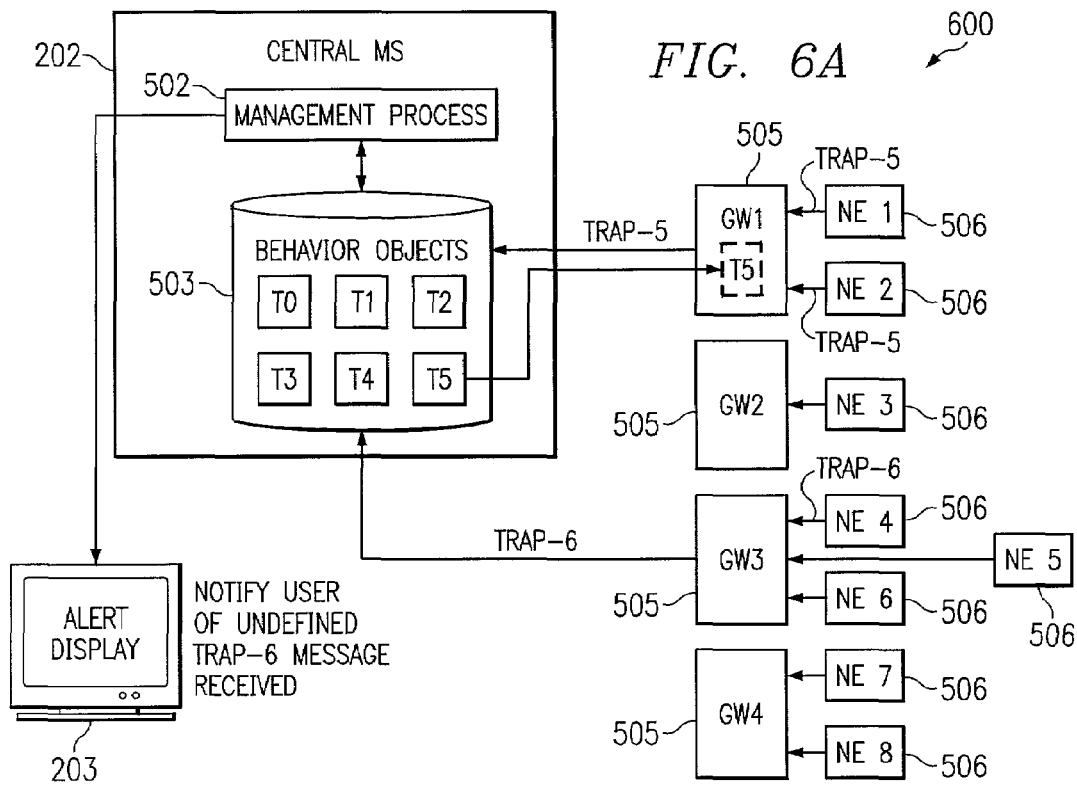
FIGS. 6A–6b show an exemplary system and operational flow diagram for the self-learning feature that may be implemented in various embodiments of the present invention.
Figure 6B:
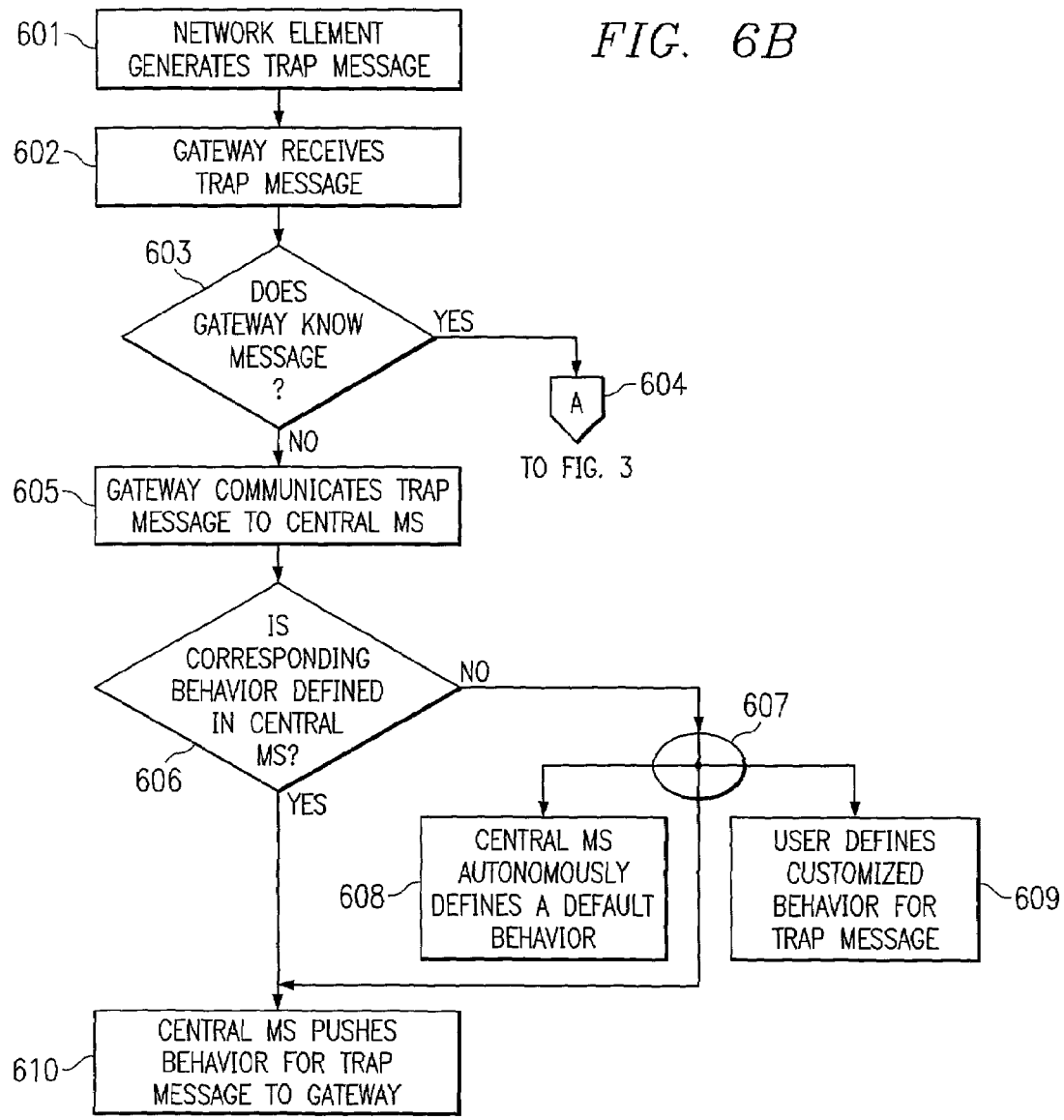

Turning now to FIGS. 6A and 6B, the self-learning feature that may be implemented in various embodiments of the present invention is further described. FIG. 6A shows an exemplary system 600 arranged much like those described above in FIGS. 2 and 5A, with like reference numbers used to identify like elements. System 600 includes central MS 202 which executes management process 502 and MIB 503 having behavior objects stored therein. Alert display 203 may be communicatively coupled to central MS 202 to provide a display (as well as input devices, such as a keyboard and mouse) for interacting with a user (e.g., a system administrator). Distributed gateways 505 are implemented to manage network elements 506, and such distributed gateways 505 are communicatively coupled to central MS 202 (e.g., via a communication network).

As an example to illustrate the self-learning feature of the management system of certain embodiments, suppose gateway GW1 receives a "Trap-5" message from network element NE 1. Further suppose that gateway GW1 has not previously received this message from any of its respective network elements (i.e., NE 1 and NE 2). Gateway GW1 determines that it does not have a management behavior for this message stored in its memory, and therefore GW1 notifies central MS 202 of its receipt of the Trap-5 message for which it has no management behavior defined. Management process 502 accesses MIB 503 to determine whether a management behavior exists for the Trap-5 message. In this example, behavior object T5, which defines a management behavior for the Trap-5 message, is found in MIB 503. Accordingly, management process 502 updates the relationship attribute associated with object T5 to specify that it is managed in gateway GW1 (in addition to any other relationships previously specified in the relationship attribute). Additionally, management object T5 is communicated to gateway GW1 to enable GW1 to initiate the appropriate management behavior for the received Trap-5 message.

Management object T5 may be stored in GW1's memory, and therefore GW1 will not have to access central MS 202 for Trap-5 messages received from its network elements in the future. Thus, for instance, FIG. 6A illustrates that GW1 may later receive a Trap-5 message from network element NE 2. In response to such Trap-5 message, GW1 determines the appropriate management behavior as defined by object T5 now stored in GW1's memory. Accordingly, GW1 is not required to access central MS 202 to determine the appropriate management behavior. Additionally, if a user later modifies the management behavior defined in object T5, such modification may automatically be communicated by central MS 202 to GW1 to keep GW1's copy of object T5 in sync with that stored in MIB 503. Central MS 202 may know that GW1 has a copy needing to be updated after such a modification because of the relationship attribute of object T5 specifying that it is now managed in GW1. Thus, the management system may effectively self-learn over time the appropriate gateways to which certain behavior objects need to be communicated.

FIG. 6A further shows an example of gateway GW3 receiving a Trap-6 message from network element NE 4. GW3 determines that it does not have a management behavior stored in its memory for such a Trap-6 message, and therefore contacts central MS 202 in the same manner as described above with gateway GW1. Management process 502 accesses MIB 503 to determine whether a management behavior exists for the Trap-6 message. In this example, a behavior object does not exist in MIB 503 for the Trap-6 message. Thus, a management behavior has not been defined for the Trap-6 message. Accordingly, management process 502 may generate an alert to alert display 203 notifying a user (e.g., system administrator) that a Trap-6 message has been received, and may offer the user the opportunity to define a management behavior for such Trap-6 message. If the user does define such a management behavior, management process 502 may autonomously update the relationship attribute for the created behavior object to specify the relationship with GW3, and central MS 202 may communicate the created behavior object to GW3 for storage in its memory.

FIG. 6B shows an exemplary operational flow diagram for a self-learning process according to at least one embodiment of the present invention. In the example of FIG. 6B, a network element generates a particular trap message at operational block 601. At operational block 602, the gateway managing such network element receives the particular trap message, and determines, at block 603, whether it has a management behavior for such particular trap message stored in its memory. If the management behavior is stored in the gateway's memory, then at block 604 operation advances to block 303 of the exemplary flow diagram of FIG. 3. If, on the other hand, the gateway determines that it does not have a management behavior for the particular trap message, the gateway communicates the trap message to the central MS at block 605 to notify the central MS that it has received a message for which it has no management behavior.

The central MS determines, at block 606, whether there is a management behavior corresponding to the particular trap message defined in the MIB. If there is not a corresponding management behavior defined in the MIB, operation advances to logical operand 607, at which either of two optional processes may be utilized (e.g., operand 607 indicates a logical OR). In certain embodiments, the central MS may, at block 608, autonomously define a default management behavior for the particular trap message, which may, for example, include generating an alert to an alert display to notify a user of the received trap message and logging the received trap message to a database. In other embodiments, the central MS may, at block 609, prompt a user to define management behavior desired for the particular trap message. Once a management behavior is defined (in either block 608 or 609), operation advances to block 610 wherein the central MS communicates the defined management behavior for the trap message to the gateway that initially received the particular trap message.

As described above, management systems often implement polling activities to supplement the information received through trap messages. Various embodiments of the present invention enable use of such polling activities, and further enable management behavior associated with such polling activities to be dynamically defined by a user. In certain embodiments, "polling services" may be defined by a user and implemented within the management system. One example of an implementation of such polling services that may be utilized in certain embodiments of the present invention is further described in co-pending patent application Ser. No. 09/770,427 entitled "SYSTEM AND METHOD FOR MANAGING A COMMUNICATION NETWORK UTILIZING STATE-BASED POLLING," the disclosure of which has been incorporated herein by reference. For instance, a user may define one or more poll services that include state model(s). Such poll services may comprise multiple state models (as well as other management behavior) therein to be simultaneously executed, much as a bus is capable of transporting multiple passengers simultaneously, which enables efficient operation of such state models (and other management behavior included within a polling service). In certain embodiments, a user may define one or more polling service conditions that a gateway utilizes to determine whether a particular polling service should be executed. For example, a user may specify that a polling service is to be executed only for a particular type of network elements (e.g., routers). The polling service may then be distributed to the appropriate gateways, and only those for which the defined polling service condition is satisfied will execute the polling service.

Furthermore, polling services and management behavior associated with such polling services may be configured by a user into "groups." A group may include one or more network elements defined therein, as well as one or more polling services to be executed for such network elements. Thus, for example, the configured groups may allow for appropriate polling services to be associated with appropriate network elements, and then the configured group(s) may be communicated to the gateway(s) implemented for managing such network elements. For example, routers in Los Angeles may be managed by a local gateway, and routers in Dallas may likewise be managed by a local gateway. Each of the gateways may be communicatively coupled to a central MS. A polling group may be defined that includes routers located in Los Angeles and specifies one or more polling services to be executed for such routers. Similarly, another polling group may be defined that includes routers located in Dallas and specifies one or more polling services to be executed for such routers. In this manner, the first polling group may be communicated to the Los Angeles gateway for execution thereon, and the second polling group may be communicated to the Dallas gateway for execution thereon. From time to time, a network administrator may modify one of the configured groups (e.g., may modify the management behavior for polling), and such modification may be communicated during run-time to the appropriate gateway for execution thereon. Thus, configured polling groups may be dynamically defined (e.g., created and modified) by a user.

Turning now to FIGS. 7A and 7B, an example of dynamically defining management behavior for polling activities as may be implemented in various embodiments of the present invention is further described. FIG. 7A shows an exemplary system 700 arranged much like those described above in FIGS. 2, 5A, and 6A, with like reference numbers used to identify like elements. System 700 includes the central MS (not shown) which executes management process 502 and MIB 503 having behavior objects (e.g., polling group objects) stored therein. Distributed gateways 505 are implemented to manage network elements 506, and such distributed gateways 505 are communicatively coupled to central MS 202 (e.g., via a communication network).

A user (e.g., system administrator) may interact with exemplary user interface 501 to configure a polling group. Various screens may be presented to a user via interface 501 to allow a user to define a polling group (e.g., create or modify a group). The management behavior defined by such a group is maintained as a behavior object (or group object) in MIB 503. From time to time, a user may dynamically create new behavior objects corresponding to polling groups and/or modify existing behavior objects for polling groups. It should be appreciated that such an implementation allows for management behavior to be defined (e.g., created or modified) and activated within the management system of certain embodiments during run-time of the management system. Thus, a user is not required to freeze or shutdown the management system to activate newly defined management behavior. Accordingly, management of the network elements is not required to be interrupted in order to modify the management behavior of the system.

Each group object stored in MIB 503 may include attributes specifying the group's relationship within the managed network. For instance, in the example of FIG. 7A, group object Gr2 includes attributes 701, which specify certain network elements and polling services included within the group. Such relationship attribute 701 further specifies that GW1 is a polling gateway that executes such group object. More specifically, attribute 701 specifies that NEs 1–2 are included within group Gr2 and have a defined polling service "P1" associated therewith, and further specifies that NE 3 is included within group Gr2 and has a defined polling service "P2" associated therewith. Additionally, groups may be embedded within other groups, which may result in a parent-child relationship wherein the children may inherit behavior defined within the parent. For instance, group object Gr5 is stored in MIB 503, includes attributes 704, which specify certain network elements and polling services included within the group. Such relationship attribute 704 further specifies that GW1 and GW2 are the polling gateways that execute such group object. More specifically, attribute 704 specifies that NEs 1 and 4 are included within group Gr5 and have a defined polling service "P3" associated therewith. Further, defined group object Gr3 is embedded as a subgroup within group object Gr5. Thus, the polling behavior defined by group object Gr3 is embedded within group object Gr5. For instance, suppose that object Gr3 further specifies that a defined polling service "P4" is to be executed for NEs 1–4, group object Gr5 having Gr3 embedded therein will implement such polling service P4 for NEs 1–4.

Therefore, because the group objects "know" the relationship of other elements (e.g., gateways and/or network elements) thereto, the group objects can automatically know which elements they need to inform when they are defined (e.g., when the objects are initially created or later modified). A user (e.g., system administrator) may specify the relationship(s) for the group object by, for instance, interacting with user interface 501 generated by management process 502.

Thus, in the example of FIG. 7A, because group object Gr2 has relationship attribute 701 specifying that it is managed in gateway GW1, the group object Gr2 is communicated from the central MS to such gateway GW1.

Accordingly, polling group object Gr2, which defines the management behavior for polling, may be stored in the memory of gateway GW1. Therefore, gateway GW1 executes polling service P1 for NEs 1–2 and polling service P2 for NE 3 as defined by polling group object Gr2. Additionally, because group object Gr5 has relationship attribute 704 specifying that it is managed in gateways GW1 and GW2, the group object Gr5 is communicated from the central MS to such gateways GW1 and GW2. Accordingly, polling group object Gr5, which defines the management behavior for polling, may be stored in the memory of gateways GW1 and GW2. Therefore, gateways GW1 and GW2 execute polling service P3 for NEs 1 and 4 as defined by polling group object Gr5. Furthermore, because group object Gr3 is embedded within group object Gr5, such group object Gr3 may be communicated to gateways GW1 and GW2 to enable such gateways to execute the polling services as defined by such group Gr3. Once stored in memory of gateways GW1 and GW2, any modification made to the polling group objects by a system administrator may be automatically communicated to such gateways to maintain the group objects stored in their memory in sync with the group objects stored in MIB 503. Further, various embodiments implemented in this manner enable for management behavior associated with polling activities to be defined (e.g., created and/or modified) during run-time of the management system.

FIG. 7B shows an exemplary operational flow diagram for managing polling activities according to at least one embodiment of the present invention. First, at operational block 710, a user interface (e.g., user interface 501 of FIG. 7A) executes on the central MS. Such a user interface may be generated by management process 502 (e.g., software code) executing on the central MS, and such user interface may be presented to a user on a display terminal communicatively coupled to the central MS. At block 711, the user interacts with the user interface to configure a group with network elements and corresponding polling services. Once the group is configured, the user activates the group in block 712. For instance, the user may click an "Apply" or an "OK" button on the user interface to activate the configured group.

In operational block 713, the central MS determines which of the distributed gateways need the configured group, and the central MS communicates the group to such gateways. At operational block 714, filters and overrides may be applied in a manner similar to that described above with trap management. For instance, an override to a polling service may be defined for a certain network element, such that a different polling service is triggered for the certain network element. Then, at operational block 715, the gateway(s) poll the network elements according to the configured group, and at block 716 operation advances to block 401 of FIG. 4 for the polling process.

In view of the above, various embodiments utilize objects to represent management behavior, such as behavior associated with trap management and/or polling management. Further, such objects may be dynamically defined by a user and activated with the management system during system run-time. Preferably, the management system is implemented in a distributed fashion with gateways distributed from a central MS. In such a distributed implementation, relationship attributes may be maintained for each behavior object to specify the appropriate one(s) of distributed gateways to which the behavior objects are to be communicated. Upon behavior objects being defined (e.g., created or modified), the system may utilize the relationship attributes associated with such behavior objects to autonomously communicate the behavior objects to the appropriate gateways. Thus, such an object-driven implementation of management behavior allows for management behavior to be dynamically defined (e.g., created and/or modified) in a manner desired by a network administrator, and further enables such defined management behavior to be activated during system run-time. Accordingly, great flexibility and ease of use in maintaining proper management behavior within a management system may be achieved.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for managing network elements of a network, said system comprising:
   at least one network element;
   a centralized management information base;
   a management processor communicatively coupled to said management information base;
   at least one gateway communicatively coupled to said management processor, said at least one gateway operable to manage said at least one network element; and
   at least one object stored in said management infomlation base defining management behavior for managing said at least one network element, said at least one object including a relationship attribute identifying said at least one gateway, wherein said management processor accesses said at least one object stored in said management information base and implements the management behavior defined by said at least one object in accordance with the relationship attribute included in said at least one object by communicating said at least one object to said at least one gateway identified by the relationship attribute of said at least one object, without said at least one gateway actively searching for said at least one object.

2. The system of claim 1 further comprising:
   software code executable by said management processor for generating a user interface with which a user can interact to define management behavior.

3. The system of claim 2 wherein user-defined management behavior can be activated at run-time of said management processor.

4. The system of claim 1 wherein said management behavior includes behavior associated with managing trap messages received from said at least one network element.

5. The system of claim 1 wherein said management behavior includes behavior associated with managing polling activities.

6. The system of claim 1 wherein said management behavior includes one or more behaviors selected from the group of:
generating an alert, logging information to a database, logging information to another system, initiating a polling activity, filtering information, performing suppression of information, performing correlation of information, performing thresholding, triggering an e-mail message, triggering a page, and any combination thereof.

7. The system of claim 1 further comprising:
a plurality of network elements; and
a plurality of said gateways distributed on the network, each gateway operable to manage one or more of said plurality of network elements.

8. The system of claim 7 further comprising:
a plurality of objects stored in said management information base each defining different management behavior.

9. The system of claim 8 wherein each of said plurality of objects includes a relationship attribute identifying at least one of said plurality of gateways that is executable to perform management behavior defined by such object.

10. The system of claim 8 wherein said management processor is operable to autonomously determine appropriate one or more of said plurality of gateways to which each of said objects relates, and wherein said management processor is operable to autonomously communicate one or more of said plurality of objects to the determined appropriate one or more of said plurality of gateways.

11. The system of claim 10 wherein the determined appropriate one or more of said plurality of gateways stores said one or more of said plurality of objects local thereto.

12. The system of claim 10 wherein the said management processor is operable to autonomously communicate one or more of said plurality of objects to the determined appropriate one or more of said plurality of gateways responsive to a user defining a new management behavior represented by said one or more of said plurality of objects.

13. The system of claim 12 wherein said management processor executes to present a user interface to a user to enable said user to define management behavior thereby creating new objects to be stored in said management information base or modifying existing ones of said objects stored in said management information base.

14. A method comprising:
implementing at least one gateway operable to manage one or more network elements of a network, said at least one gateway being communicatively coupled to a management processor;
defining a management behavior;
representing said management behavior as a behavior object;
storing said behavior object in a centralized information base communicatively coupled to said management processor;
said management processor determining an appropriate one or more of said at least one gateway that is to perform said defined management behavior; and
said management processor autonomously communicating said behavior object from the centralized information base to the one or more determined gateways without the one or more determined gateways actively searching for said behavior object.

15. The method of claim 14 wherein said determining by the management processor further comprises:
said management processor identifying said appropriate one or more of said at least one gateway that is to perform said defined management behavior based at least in part on a relationship attribute associated with said behavior object that specifies the appropriate one or more gateways.

16. The method of claim 15 wherein said determining by the management processor further comprises:
said management processor receiving input from a user identifying said appropriate one or more of said at least one gateway that, is to perform said defined management behavior; and
said management processor storing the said appropriate one or more of said at least one gateway in a relationship attribute associated with said behavior object.

17. The method of claim 14 further comprising:
presenting a user interface to enable a user to perform said defining.

18. The method of claim 14 wherein said management behavior includes behavior associated with managing trap messages received from said one or more network elements.

19. The method of claim 14 wherein said management behavior includes behavior associated with managing polling activities.

20. The method of claim 14 wherein said management behavior includes one or more behaviors selected from the group of:
generating an alert, logging information to a database, logging information to another system, initiating a polling activity, filtering information, performing suppression of Information, performing correlation of information, performing thresholding, triggering an e-mail message, triggering a page, and any combination thereof.

21. The method of claim 14 further comprising:
activating said one or more determined gateways during run-time.

22. A system comprising:
plurality of distributed gateways each operable to manage one or more network elements, each of said distributed gateways comprising code executable in accordance with one or more behavior objects stored local thereto; and
a central management processor communicatively coupled to said distributed gateways and also communicatively coupled to an information base having user-defined behavior objects stored therein, wherein said central management processor executes a management process which autonomously determines one or more of said plurality of distributed gateways to which one or more of said user-defined behavior objects stored in said information base are to be communicated, and which causes said one or more of the user-defined behavior objects to be communicated and thereby stored locally in the determined one or more of said plurality of distributed gateways without the determined one or more of said plurality of distributed gateways actively searching for said one or more of the user-defined behavior objects, so that the code of said one of more of said plurality of distributed gateways executes in accordance with the communicated one or more of said user-defined behavior objects.

23. The system of claim 22, wherein said one or more of said user-defined objects communicated to the determined one or more of said plurality of distributed gateways dictate proper management behavior for the determined one or more of said plurality of distributed gateways.

24. The system of claim 22 wherein said central management processor executes a management process to communicate one or more of said user-defined behavior objects to one or more of said distributed gateways during run-time of said central management processor.

25. The system of claim 24, wherein said one or more of said user-defined behavior objects communicated to said one or more of said distributed gateways dictate management behavior represented by said one or more of said user-defined behavior objects to be executed by said one or more of said distributed gateways.

26. A system comprising:
   a plurality of distributed gateways each operable to manage one or more network elements;
   a central information base storing user-defined behavior objects, each behavior object having a relationship attribute identifying a distributed gateway of the plurality of distributed gateways to execute the respective behavior object, and each behavior object defining management behavior for managing the distributed gateway identified by the relationship attribute of the respective behavior object; and
   a central management processor which, in accordance with the relationship attribute of a respective behavior object, communicates the respective behavior object stored in the information base to the distributed gateway identified by the relationship attribute of the respective behavior object, without the distributed gateway actively searching for the respective behavior object, so that the communicated behavior object is stored locally in, and then executed by, the distributed gateway.

27. A system comprising:
   a plurality of distributed gateways each operable to manage one or more network elements;
   a central information base storing user-defined behavior objects, each behavior object having a relationship attribute identifying a distributed gateway of the plurality of distributed gateways to execute the respective behavior object, and each behavior object defining management behavior for managing the distributed gateway identified by the relationship attribute of the respective behavior object; and
   means for, in accordance with the relationship attribute of a respective behavior object communicating the respective behavior object stored in the information base to the distributed gateway identified by the relationship of the respective behavior object without the distributed gateway actively searching for the respective behavior object, so that the communicated behavior object is stored locally in, and then executed by, the distributed gateway.

28. A system comprising:
   a plurality of distributed gateways each operable to manage one or more network elements;
   a central information base storing user-defined behavior objects, each behavior object defining management behavior for managing a distributed gateway of the plurality of distributed gateways; and
   a central management processor accessing a respective behavior object stored in the information base and causing the respective behavior object to be communicated to the distributed gateway for which the respective behavior object defines management behavior without the distributed gateway actively searching for the respective behavior object, so that the communicated behavior object is stored locally in, and then executed by, the distributed gateway.

* * * * *

UNITED STATES PATENT AND TRADEMARK OFFICE
CERTIFICATE OF CORRECTION

PATENT NO. : 6,990,518 B1  Page 1 of 1
DATED : January 24, 2006
INVENTOR(S) : Secer It is certified that error appears in the above-identified patent and that said Letters Patent is hereby corrected as shown below:

Title page,
*Primary Examiner*, delete "Arid Etienne" and insert -- Ario Etienne --.

Column 18,
Line 34, delete "base;" and insert -- base having at least one user-defined behavior object; --.
Line 41, delete "infomlation" and insert -- information --.

Column 20,
Line 9, delete "that," and insert -- that --.
Line 29, delete "Information," and insert -- information, --.
Line 50, delete "communicated," and insert -- communicated --.

Signed and Sealed this

Twenty-third Day of May, 2006

JON W. DUDAS
*Director of the United States Patent and Trademark Office*